(12) United States Patent
Binek et al.

(10) Patent No.: US 11,802,714 B2
(45) Date of Patent: Oct. 31, 2023

(54) EXHAUST MANIFOLD FOR ADDITIVE MANUFACTURING

(71) Applicant: Hamilton Sundstrand Corporation, Charlotte, NC (US)

(72) Inventors: Lawrence Binek, Glastonbury, CT (US); Zachary Ryan Gibbons, Hartford, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 539 days.

(21) Appl. No.: 16/428,020

(22) Filed: May 31, 2019

(65) Prior Publication Data
US 2020/0376595 A1    Dec. 3, 2020

(51) Int. Cl.
*F24F 13/10*    (2006.01)
*B33Y 30/00*    (2015.01)
(Continued)

(52) U.S. Cl.
CPC .............. *F24F 13/10* (2013.01); *B22F 10/28* (2021.01); *B22F 10/322* (2021.01); *B22F 12/70* (2021.01);
(Continued)

(58) Field of Classification Search
CPC .............. B23K 26/142; B23K 26/1437; B23K 26/1438; B23K 26/342; B23K 26/127; B33Y 10/00; B33Y 30/00; B33Y 40/00; B29C 64/30; B22F 10/20; B22F 12/00; B22F 10/322; B22F 12/70; F24F 13/10;
(Continued)

(56) References Cited

U.S. PATENT DOCUMENTS 7,456,429 B2    11/2008    Levy
10,112,236 B2 *    10/2018    Schlick ................. B22F 10/322
(Continued)

FOREIGN PATENT DOCUMENTS

| CN | 106623928 A | * | 5/2017 | .............. B22F 10/20 |
| CN | 109226762 A | * | 1/2019 | .............. B22F 12/00 |
| TR | 201709860 A2 | | 1/2019 | |

OTHER PUBLICATIONS

Machine English Translation of CN-106623928-A (Year: 2017).*
(Continued)

*Primary Examiner* — Sang Y Paik
*Assistant Examiner* — Erwin J Wunderlich
(74) *Attorney, Agent, or Firm* — Locke Lord LLP; Daniel J. Fiorello; Gabrielle L. Gelozin

(57) ABSTRACT

An exhaust manifold for an additive manufacturing system includes a manifold housing, at least one baffle movable relative to the manifold housing configured to modify an exhaust flow area defined in part by the at least one baffle, and an actuator operatively connected to the at least one baffle configured to move the at least one baffle. The manifold housing defines a housing channel. The at least one baffle can be one or more moveable baffles at least partially disposed within the housing channel and configured to move relative to the housing to modify a respective exhaust flow area of a respective baffle of the one or more moveable baffles. The actuator is operatively connected to each of the one or more movable baffles and configured to move the one or more movable baffles relative to the housing.

9 Claims, 6 Drawing Sheets

(51) Int. Cl.
*B33Y 40/00* (2020.01)
*B23K 26/142* (2014.01)
*B23K 26/14* (2014.01)
*B23K 26/12* (2014.01)
*B29C 64/30* (2017.01)
*B22F 10/322* (2021.01)
*B22F 12/70* (2021.01)
*B33Y 10/00* (2015.01)
*B23K 26/342* (2014.01)
*B22F 10/28* (2021.01)
*B22F 12/90* (2021.01)

(52) U.S. Cl.
CPC .......... *B23K 26/127* (2013.01); *B23K 26/142* (2015.10); *B23K 26/1437* (2015.10); *B23K 26/1438* (2015.10); *B23K 26/342* (2015.10); *B29C 64/30* (2017.08); *B33Y 10/00* (2014.12); *B33Y 30/00* (2014.12); *B33Y 40/00* (2014.12); *B22F 12/90* (2021.01)

(58) Field of Classification Search
CPC .... F01N 13/10; F01N 13/105; F01N 2240/20; F01N 2260/14; F01N 2590/10
USPC .......................................................... 60/297
See application file for complete search history.

(56) References Cited

U.S. PATENT DOCUMENTS

| | | | | |
|---|---|---|---|---|
| 10,315,252 B2* | 6/2019 | Symeonidis | ........... | B23K 26/10 |
| 10,343,216 B2* | 7/2019 | Domrose | .............. | B29C 64/182 |
| 10,442,001 B2* | 10/2019 | Jakimov | ................ | B33Y 30/00 |
| 11,014,304 B2* | 5/2021 | Wakelam | ................ | B29C 64/25 |
| 11,298,716 B2* | 4/2022 | Wakelam | ................ | B29C 64/371 |
| 11,331,726 B2* | 5/2022 | Herzog | ................. | B29C 64/307 |
| 11,400,649 B2* | 8/2022 | Patel | ..................... | B29C 64/364 |
| 11,453,087 B2* | 9/2022 | Sweetland | .............. | B22F 10/28 |
| 2016/0045981 A1* | 2/2016 | Zurecki | ................... | B22F 12/00 |
| | | | | 219/76.12 |
| 2016/0114531 A1* | 4/2016 | Chuang | .................... | B22F 10/30 |
| | | | | 264/497 |
| 2017/0282463 A1* | 10/2017 | Schilling | ................ | B33Y 30/00 |
| 2018/0010237 A1* | 1/2018 | Forseth | ................... | B22F 10/00 |
| 2018/0126649 A1* | 5/2018 | Romano | ................ | B29C 64/371 |
| 2018/0133967 A1* | 5/2018 | Bechmann | ............. | B33Y 30/00 |
| 2018/0236550 A1 | 8/2018 | Ierzog | | |
| 2018/0272623 A1* | 9/2018 | Ho | ........................ | B29C 48/865 |
| 2020/0039000 A1* | 2/2020 | Sweetland | ......... | B23K 26/1476 |
| 2020/0061656 A1* | 2/2020 | Shalaby | .................. | B22F 10/77 |
| 2020/0198007 A1* | 6/2020 | Kitani | .................... | C04B 35/653 |
| 2020/0391289 A1* | 12/2020 | Weaver | ................... | B22F 12/70 |
| 2021/0101341 A1* | 4/2021 | Zhang | ..................... | B29C 64/35 |
| 2021/0362238 A1* | 11/2021 | Zeilinger | ............... | B29C 64/371 |

OTHER PUBLICATIONS

Machine English Translation of CN-109226762-A (Year: 2019).*
Extended European search report issued in corresponding EP application No. 19211154.0, dated Apr. 28, 2020.

* cited by examiner

EXHAUST MANIFOLD FOR ADDITIVE MANUFACTURING

FIELD

This disclosure relates to additive manufacturing, more specifically to exhaust manifolds for additive manufacturing.

BACKGROUND

Additive manufacturing laser powder bed systems use gas flow in the build volume to improve build quality. The gas flow occurs above the build plate and is intended to push gas discharge away from the melt pool and prevent laser interference. In traditional systems, gas flow from the nozzle to the exhaust manifold is not constant. The gas flow varies across the length of the gas nozzle. Poor flow distribution leads to "keep out" areas on the build plate where a user avoids building due to poor flow. Further, uneven gas flow results in reduction of build quality.

Such conventional methods and systems have generally been considered satisfactory for their intended purpose. However, there is still a need in the art for improved gas flow systems and components. The present disclosure provides a solution for this need.

SUMMARY

In accordance with at least one aspect of this disclosure, an exhaust manifold for an additive manufacturing system can include a manifold housing, at least one baffle movable relative to the manifold housing configured to modify an exhaust flow area defined in part by the at least one baffle, and an actuator operatively connected to the at least one baffle configured to move the at least one baffle. The manifold housing can define a housing channel. The at least one baffle can be one or more moveable baffles at least partially disposed within the housing channel and configured to move relative to the housing to modify a respective exhaust flow area of a respective baffle of the one or more moveable baffles. The actuator can be operatively connected to each of the one or more movable baffles and configured to move the one or more movable baffles relative to the housing.

The one or more moveable baffles can include a plurality of moveable baffles configured to move relative to the housing and relative to each other to modify a respective exhaust flow area. Each of the plurality of baffles can include an L-shape, or any other suitable shape.

Each movable baffle can be positioned in overlapping series with each other such that each respective exhaust flow area is defined between adjacent baffles. Each moveable baffle can include a different shape and/or size compared to an adjacent baffle to fit each moveable baffle within the manifold housing.

In certain embodiments, the manifold can include a controller configured to control each actuator as a function of data from a flow field sensor in the additive manufacturing system. The controller can include any suitable hardware and/or software module(s) as appreciated by those having ordinary skill in the art.

Each actuator can include a worm gear or any other suitable type of actuator (e.g., a stepper motor). Each actuator can be mounted to an outside surface of the manifold housing, for example, or in any other suitable location.

In certain embodiments, the one or more moveable baffles can be connected to each actuator through a slot in the manifold housing.

In accordance with at least one aspect of this disclosure, an additive manufacturing sweep flow system can include a flow source (e.g., an inlet manifold) and an exhaust manifold. The exhaust manifold can be any suitable embodiment as disclosed herein (e.g., as described above). In certain embodiments, the system can include a flow field sensor and a controller configured to control each actuator as a function of data from the flow field sensor in the additive manufacturing system.

In accordance with at least one aspect of this disclosure, a method can include modifying an exhaust flow area in a portion of an exhaust manifold to control flow distribution over a build plate of an additive manufacturing system. Controlling flow distribution can include modifying a flow field, for example. Any other suitable methods and/or portions thereof are contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
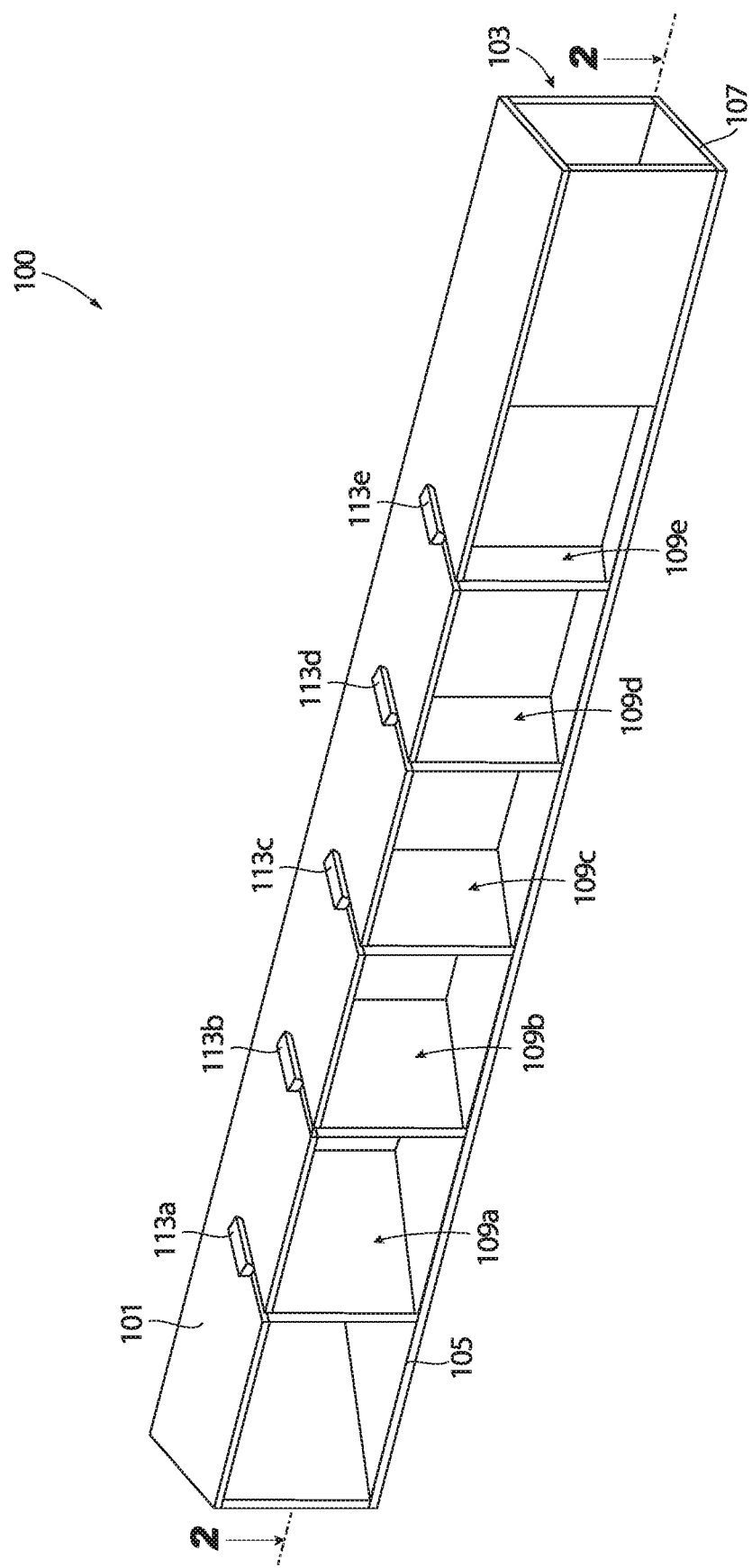
FIG. 1 is a perspective view of an embodiment of an exhaust manifold in accordance with this disclosure.

Reference will now be made to the drawings wherein like reference numerals identify similar structural features or aspects of the subject disclosure. For purposes of explanation and illustration, and not limitation, an illustrative view of an embodiment of an exhaust manifold in accordance with the disclosure is shown in FIG. 1 and is designated generally by reference character 100. Other embodiments and/or aspects of this disclosure are shown in FIGS. 2-7. Certain embodiments described herein can be used to control a flow field over a build plate in an additive manufacturing system, for example.

Figure 2:
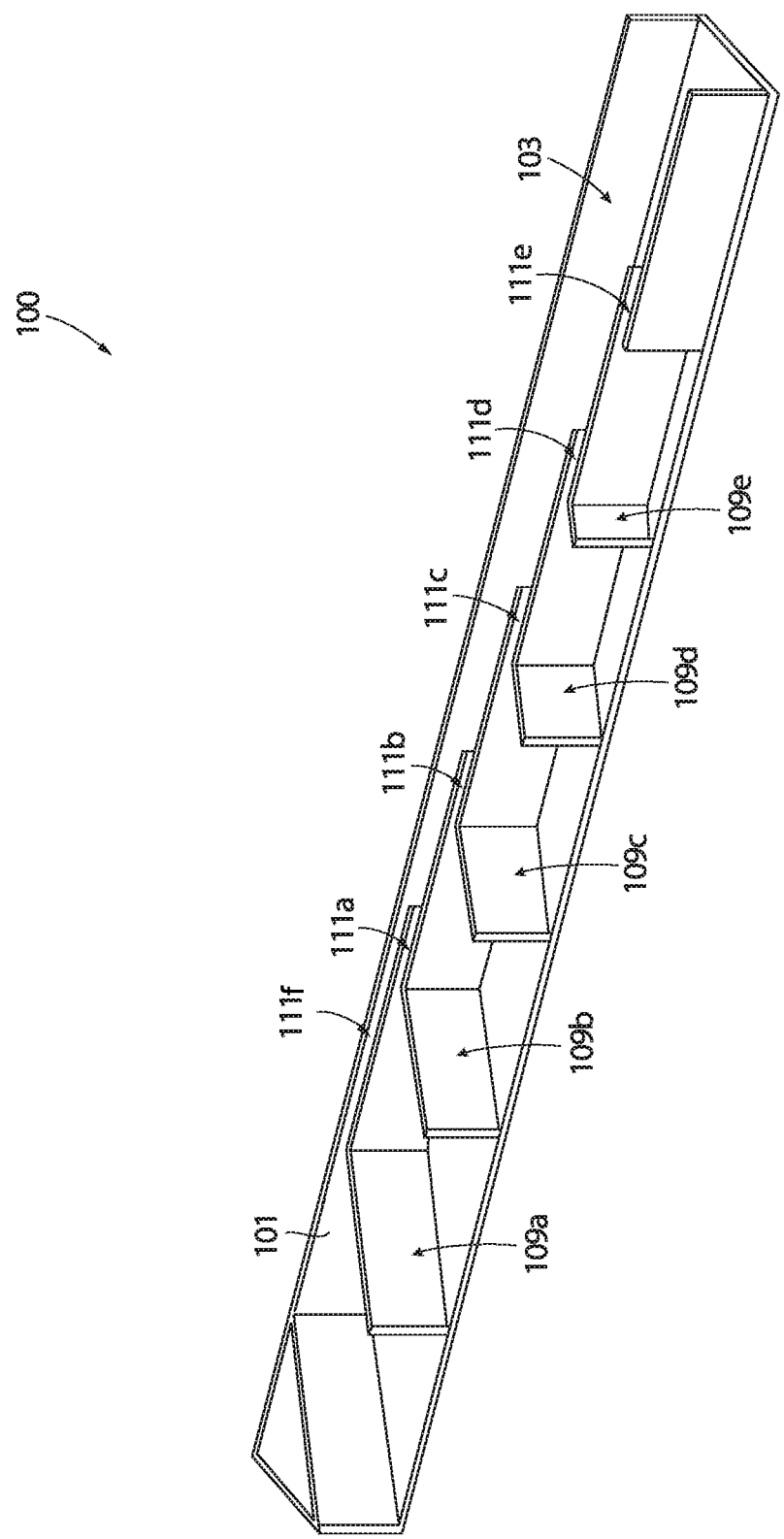
FIG. 2 is a cut-away perspective view of the embodiment of FIG. 1.

Referring to FIGS. 1 and 2, an exhaust manifold 100 for an additive manufacturing system can include a manifold housing 101, at least one baffle 109a, b, c, d, e movable relative to the manifold housing 101 and configured to modify an exhaust flow area defined in part by the at least one baffle 109a, b, c, d, e, and an actuator 113a, b, c, d, e operatively connected to the at least one baffle 109a, b, c, d, e and configured to move the at least one baffle 109a, b, c, d, e. The manifold housing 101 can define a housing channel 103. The housing 101 can define an inlet opening 105 (e.g., defined along a long axis of the housing 101) and an outlet opening 107 (e.g., defined in an end of the housing 101) in fluid communication through the housing channel 103.

The at least one baffle 109a, b, c, d, e can include one or more moveable baffles 109a, b, c, d, e, at least partially disposed within the housing channel 103 and configured to move relative to the housing 101 to modify a respective exhaust flow area 111a, b, c, d, e, f of a respective baffle of the one or more moveable baffles 109a, b, c, d, e, for example, as shown.

The manifold 100 can include an actuator 113a, b, c, d, e can be operatively connected to each of the one or more movable baffles 109a, b, c, d, e. Each actuator 113a, b, c, d, e can be configured to move the one or more movable baffles 109a, b, c, d, e relative to the housing 101. In certain embodiments, the one or more baffles 109a, b, c, d, e can be disposed in a linear track (e.g., resting on the housing and/or including bearings) in the housing 101 to fix the one or more baffles 109a, b, c, d, e to sliding motion in 1 axis, for example. Any other suitable configuration for controlling the motion of the one or more baffles 109a, b, c, d, e is contemplated herein.

Each actuator 113a, b, c, d, e can include a worm gear or any other suitable type of actuator (e.g., a stepper motor, any other suitable linear motor and/or assembly). Each actuator 113a, b, c, d, e can be mounted to an outside surface of the manifold housing 101 (e.g., as shown), for example, or in any other suitable location. In certain embodiments, the one or more moveable baffles 109a, b, c, d, e can be connected to each actuator through a slot (shown covered by an arm of each actuator) in the manifold housing 101.

The one or more moveable baffles 109a, b, c, d, e can include a plurality of moveable baffles 109a, b, c, d, e, for example, as shown. The plurality of baffles 109a, b, c, d, e can be configured to move relative to the housing 101 and relative to each other to modify a respective exhaust flow area 111a, b, c, d, e, f for example. Each of the plurality of baffles 109a, b, c, d, e can include an L-shape, e.g., as shown, or any other suitable shape. The L-shape can act to redirect flow to the outlet 107. The one or more baffles 109a, b, c, d, e can be made of sheet metal or any other suitable material, for example (e.g., plastic, ceramic).

As shown in FIG. 2, each movable baffle 109a, b, c, d, e can be positioned in overlapping series with each other such that each respective exhaust flow area 111a, b, c, d can be defined between adjacent baffles (e.g., as shown between 109a and 109b). Each moveable baffle 109a, b, c, d, e can include a different shape and/or size compared to an adjacent baffle to fit each moveable baffle 109a, b, c, d, e within the manifold housing 101 in the overlapping series.

Figure 3:
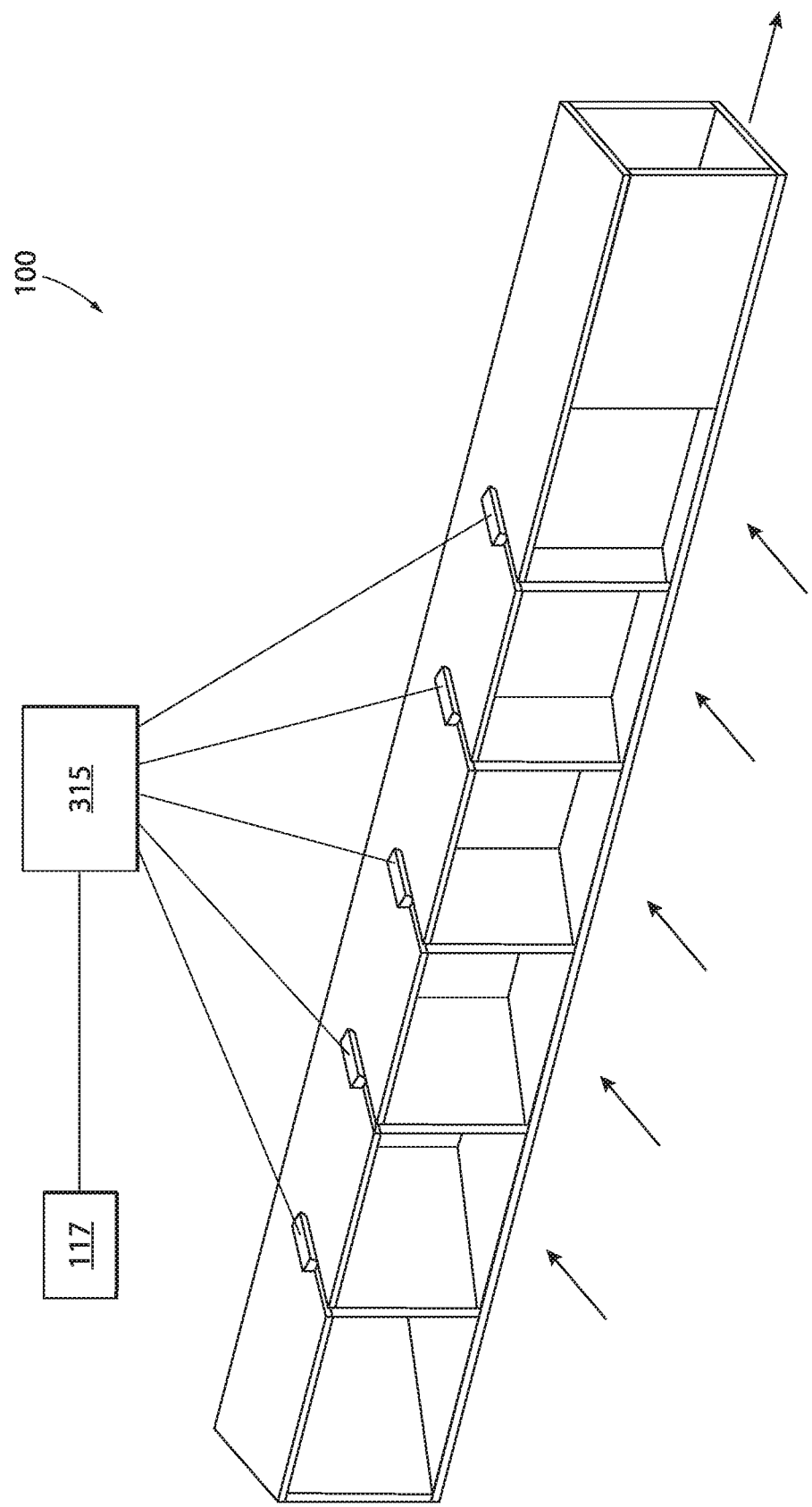
FIG. 3 is a perspective view of the embodiment of FIG. 1, showing an embodiment of a controller operatively connected thereto.
Figure 5:
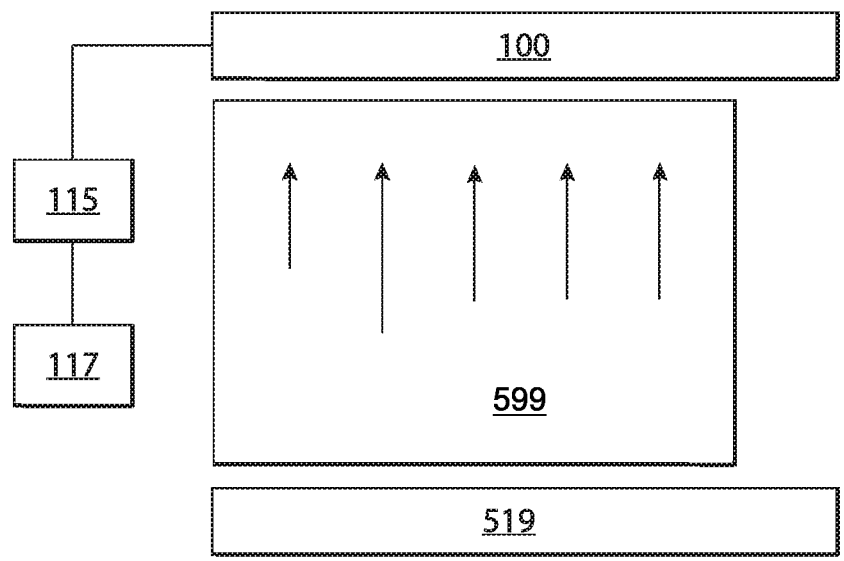
FIG. 5 is a schematic plan view of a system in accordance with this disclosure, showing an uneven flow field traversing a build area corresponding to the state of the embodiment of FIG. 4.
Figure 7:
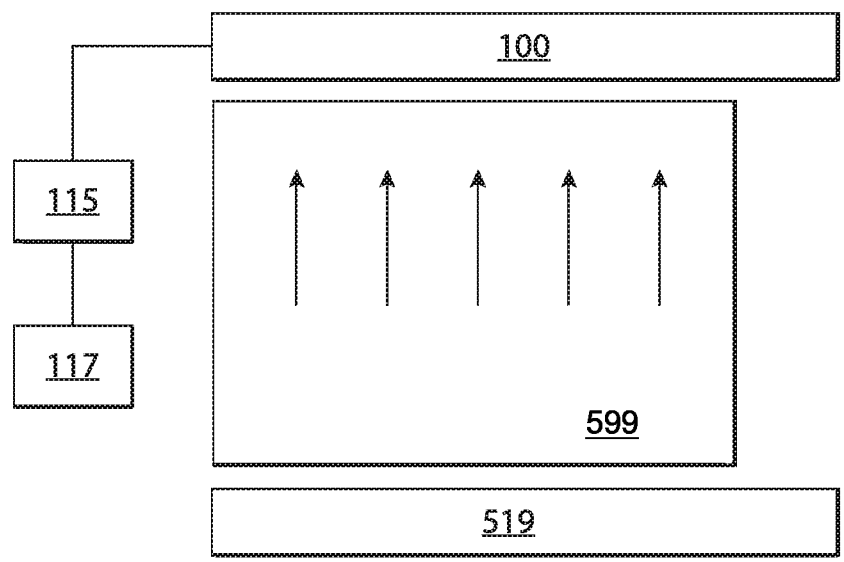
FIG. 7 is a schematic plan view of the system of FIG. 5, showing an even flow field traversing a build area corresponding to the state of the embodiment of FIG. 6.

Referring additionally to FIG. 3, in certain embodiments, the manifold 100 can include a controller 315 configured to control each actuator 113a, b, c, d, e as a function of data from a flow field sensor 117 in the additive manufacturing system (e.g., as shown in FIGS. 5 and 7). For example, the controller 115 can be configured to enlarge one or more flow areas 111a, b, c, d, e, f if a respective portion of a flow field is relatively low flow compared to another portion of the flow field. The controller 115 can include any suitable hardware and/or software module(s) as appreciated by those having ordinary skill in the art. The controller 315 can be integrated with (e.g., attached to) or separate from the housing 101, for example.

Referring additionally to FIGS. 4, 5, 6, and 7, an additive manufacturing sweep flow system 500 can include a flow source 519 (e.g., an inlet manifold) and an exhaust manifold 100. The exhaust manifold 100 can be any suitable embodiment as disclosed herein (e.g., as described above). In certain embodiments, the system 500 can include a flow field sensor 117 and a controller 115 configured to control each actuator 113a, b, c, d, e as a function of data from the flow field sensor 117 in the additive manufacturing system 500.

The flow field sensor 117 can include any suitable device positioned in any suitable location in the system 500. For example, the flow field sensor 117 can include a series of pressure taps on an airfoil limb to determine flow speed in at least a portion of the flow field (e.g., one pressure tap per baffle in a corresponding location).

Figure 4:
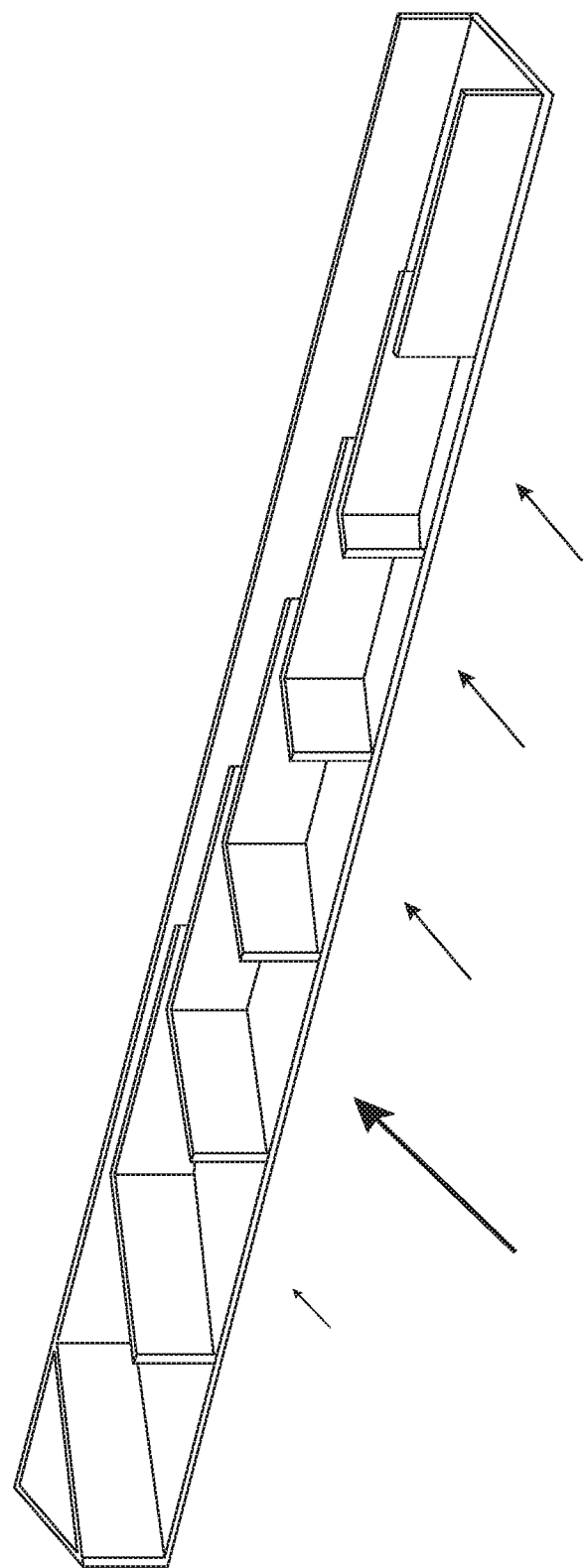
FIG. 4 is a cut-away perspective view of the embodiment of FIG. 1, shown in a first state resulting in an uneven flow field.
Figure 6:
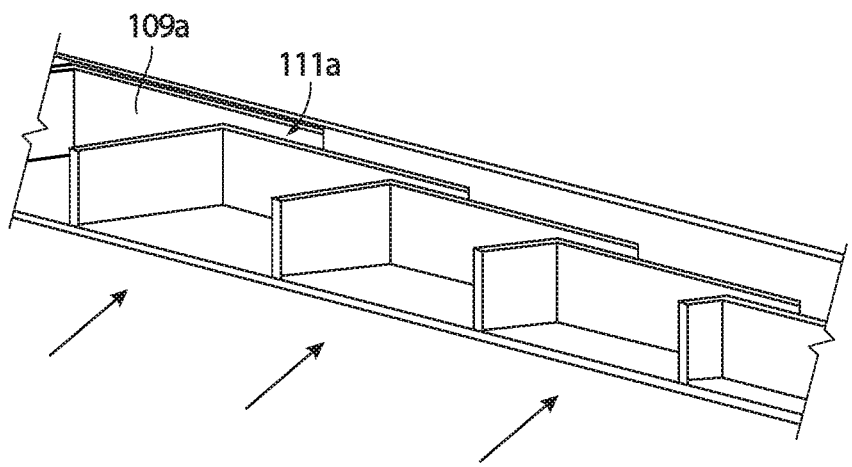
FIG. 6 is a partial cut-away perspective view of the embodiment of FIG. 1, shown in a second state resulting in an even flow field.

FIG. 4 shows baffles 109a, b, c, d, e in a first state (e.g., baffles 109a, b, c, d, e have approximately equivalent exhaust flow areas 111a, b, c, d, e, f) resulting in an uneven flow field. FIG. 5 shows an uneven flow field traversing a build area corresponding to the state shown in FIG. 4. FIG. 6 shows the baffles 109a, b, c, d, e in a second state (e.g., where baffle 109a is moved backward to open the exhaust flow area 111a which is shown as larger than in FIGS. 1-4, and flow area 111f is shown as smaller) resulting in an even flow field. FIG. 7 shows the even flow field traversing a build area corresponding to the state shown in FIG. 6. As show in the FIGS. 4-7, the size and/length of the arrows indicates a flow strength, such that a larger or longer arrow indicates more or faster flow.

In accordance with at least one aspect of this disclosure, a method can include modifying an exhaust flow area in a portion of an exhaust manifold to control flow distribution over a build plate (e.g., build plate 599 as shown in FIGS. 5 and 7) of an additive manufacturing system. Controlling flow distribution can include modifying a flow field, for example. Any other suitable methods and/or portions thereof are contemplated herein. Any suitable method herein can be performed by any suitable computer hardware and/or software as appreciated by those having ordinary skill in the art in view of this disclosure.

Embodiments can be a drop in replacement for existing exhaust manifolds of additive manufacturing systems. Embodiments can allow changing of position of baffles to control the flow field over the build plate to create uniform and consistent flow field and to eliminate "keep out zones."

Certain embodiments can be controlled manually. For example, in certain embodiments, an operator can monitor sweeping gas and change a position of the one or more baffles when it is not flowing properly.

Embodiments include a variable baffle exhaust manifold that can address existing issues with additive manufacturing systems. As disclosed above, embodiments can include a sequence of baffles can be actuated by linear drives, for example, and can be stabilized by linear bearings (not shown) to allow the baffles to move along the axis of the linear drive. Embodiments can increase or decrease the spacing (e.g., the cross sectional outlet area of the baffles) between the baffles which can affect the flow distribution. This can enable the baffles to be controlled as a function of the gas flow from the flow source (e.g., the gas nozzle). This allows mitigation of irregular gas flow affects which are present in additive manufacturing build systems. Embodiments can include flow sensors mounted in the gas nozzle or the build plate area and can result in a real-time and/or adaptive control system for the exhaust manifold.

A constant gas flow in the build chamber improves build quality of the part. Less variation in the operating conditions leads to a more predictable build with fewer internal defects.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An exhaust manifold for an additive manufacturing system, comprising:
   a manifold housing;
   at least one baffle movable relative to the manifold housing configured to modify an exhaust flow area defined in part by the at least one baffle; and
   an actuator operatively connected to the at least one baffle configured to move the at least one baffle,
   wherein the manifold housing defines a housing channel, wherein the at least one baffle includes one or more moveable baffles at least partially disposed within the housing channel and configured to move relative to the housing to modify a respective exhaust flow area of a respective baffle of the one or more moveable baffles, wherein the actuator is operatively connected to each of the one or more movable baffles to move the one or more movable baffles relative to the housing, wherein the one or more moveable baffles include a plurality of moveable baffles configured to move relative to the housing and relative to each other to modify the respective exhaust flow area, wherein each of the plurality of moveable baffles includes an L-shape, wherein each movable baffle is positioned in overlapping series with each other such that each respective exhaust flow area is defined between adjacent moveable baffles, wherein each moveable baffle includes a different shape and/or size compared to an adjacent moveable baffle to fit each moveable baffle within the manifold housing, further comprising a controller configured to control the actuator to move the one or more moveable baffles as a function of data from a flow field sensor in the additive manufacturing system, wherein the controller is configured to control the actuator to move the one or more moveable baffles to enlarge the respective exhaust flow area if a respective portion of a flow field is relatively low flow compared to another portion of the flow field.

2. The manifold of claim 1, wherein the actuator includes a worm gear.

3. The manifold of claim 1, wherein the actuator is mounted to an outside surface of the manifold housing.

4. The manifold of claim 3, wherein the one or more moveable baffles are connected to the actuator through a slot in the manifold housing.

5. An additive manufacturing sweep flow system, comprising:
   an inlet manifold; and
   an exhaust manifold, comprising:
      a manifold housing defining a housing channel;
      one or more moveable baffles at least partially disposed within the housing channel and configured to move relative to the housing to modify a respective exhaust flow area of a respective baffle of the one or more moveable baffles; and
      an actuator operatively connected to each of the one or more movable baffles to move the one or more movable baffles relative to the housing,
   wherein the one or more moveable baffles include a plurality of moveable baffles configured to move relative to the housing and relative to each other to modify the respective exhaust flow area, wherein each of the plurality of moveable baffles includes an L-shape, wherein each movable baffle is positioned in overlapping series with each other such that each respective exhaust flow area is defined between adjacent moveable baffles, wherein each moveable baffle includes a different shape and/or size compared to an adjacent moveable baffle to fit each moveable baffle within the manifold housing, further comprising a flow field sensor and a controller configured to control the actuator to move the one or more moveable baffles as a function of data from the flow field sensor in the additive manufacturing system, wherein the controller is configured to control the actuator to move the one or more moveable baffles to enlarge the respective exhaust flow area if a respective portion of a flow field is relatively low flow compared to another portion of the flow field.

6. The manifold of claim 5, wherein the actuator is mounted to an outside surface of the manifold housing.

7. The manifold of claim 6, wherein the one or more moveable baffles are connected to the actuator through a slot in the manifold housing.

8. A method, comprising:
   modifying an exhaust flow area in a portion of an exhaust manifold to control flow distribution over a build plate of the additive manufacturing sweep flow system of claim 5 as a function of data from a flow field sensor in the additive manufacturing sweep flow system, wherein modifying the exhaust flow area includes controlling an actuator to move one or more baffles to enlarge one or more flow areas based on the data from the flow field sensor.

9. The method of claim 8, wherein controlling flow distribution includes modifying the flow field.

* * * * *